W. F. MAIN.
VARIABLE SPEED DEVICE.
APPLICATION FILED JUNE 1, 1909.

939,427.

Patented Nov. 9, 1909.

Witnesses
Jos. F. Simmons
Ben L. Cornum

William F. Main
Inventor
by J. M. Thomas
Attorney

UNITED STATES PATENT OFFICE.

WILLIAM F. MAIN, OF SALT LAKE CITY, UTAH.

VARIABLE-SPEED DEVICE.

939,427.

Specification of Letters Patent.

Patented Nov. 9, 1909.

Application filed June 1, 1909. Serial No. 499,589.

*To all whom it may concern:*

Be it known that I, WILLIAM F. MAIN, a citizen of the United States, residing at Salt Lake City, in the county of Salt Lake and State of Utah, have invented certain new and useful Improvements in Variable-Speed Devices, of which the following is a specification.

The purpose of my invention is to provide a device for changing the speed of a machine which is run by a belt, by means of an adjustable pulley without stopping the machine. This object I attain by the device illustrated in the accompanying drawings in which similar characters of reference indicate like parts throughout the several figures.

Figure 1:
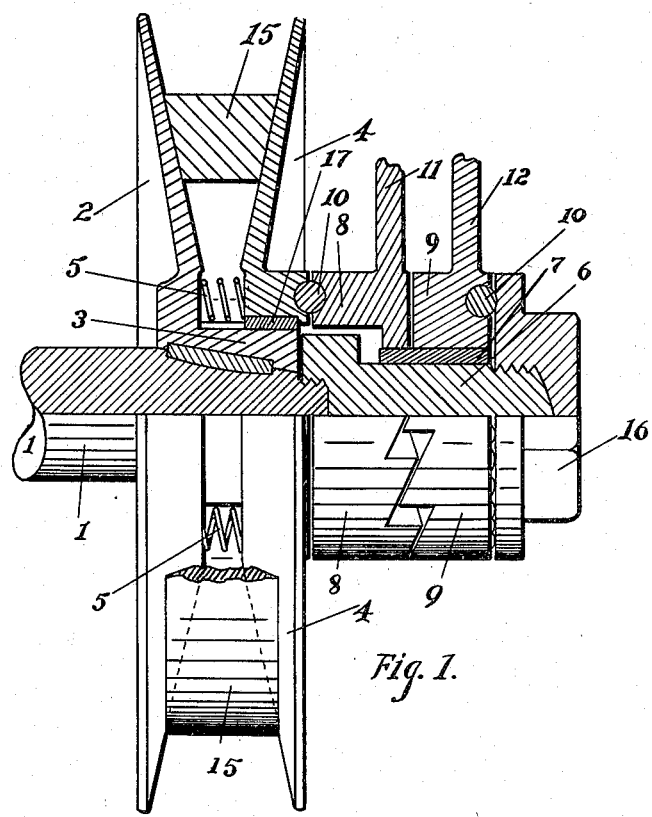
Figure 2:
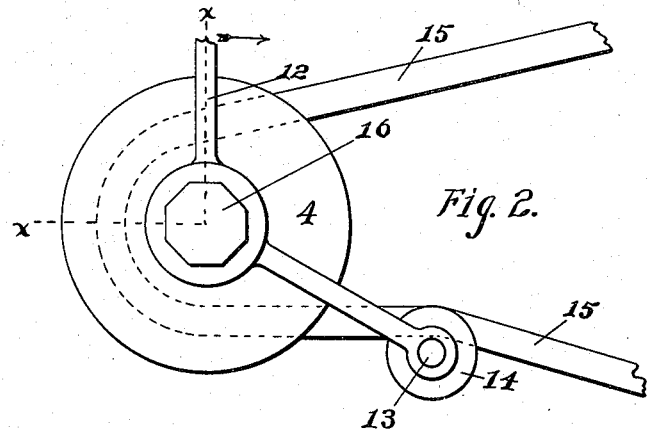

Figure 1 is an elevation, one quarter in section, on line x x Fig. 2. Fig. 2 is a side elevation.

On the driving shaft 1 is keyed one disk 2 of the pulley, which disk is provided with an extended hub 3. The other disk 4 is slidably keyed to said hub 3 by the key 17, permitting independent lateral motion, but the same rotary motion as the other disk and the shaft. Without detracting from the spirit of the invention the same result may be accomplished by having disk 4 keyed to the shaft with an extended hub and disk 2 slidably keyed to it. The two disks are spaced apart by the springs 5, thus forming an annular channel whose sides are inclined outwardly. It is not my intention to confine myself to the spiral spring as shown. Any form of spring may be used that will allow the disks to co-act in rotary motion, and permit the width of said annular channel to be changed.

An extension of the shaft 1, in the form of the nut 6, is threadably secured thereon, on which is carried the sleeve 7, which sleeve 7 acts as a bearing for the cams 8 and 9. Between the cam 8 and the hub of the disk 4 is fitted the ball bearings 10. The cam 8 has a lever or handle 11 keyed thereon or formed integral therewith to operate and secure the cam 8 in the desired position. The cam 9 is adapted to engage the other cam 8 on one side and has ball bearings 10' on the other side, and secured thereon or formed integral therewith is an operating lever 12. The lower end of said lever 12 is extended as bearings 13 for the belt tightener 14. The cams 8 and 9 are kept on said sleeve 7 by the cap nut 16 which also retains the ball bearing 10 in contact with the cam 9.

An endless belt 15 has its edges cut on the same angle as the sides of the disks 2 and 4 thus forming a friction contact with the edges of said belt 15. This contact is changed by the adjustment of the disks 2 and 4. The said belt 15 when made to move over another pulley (not shown) will engage by the friction of its edges with the inner sides of the disks 2 and 4. The levers 11 and 12, the lower portions of which are shown in the drawings, are alike in form as to the parts not shown and each is a simple lever engaging or fastened when so desired in slots in a rack bar of the ordinary make.

Motion having been imparted to the pulley and thereby to the shaft 1, and desiring to increase the speed of the shaft 1, the lever 12 is moved in the direction of the arrow. This movement of the lever 12 will rotate the cam 9 on said sleeve 7. The jaws of this cam will engage with the jaws of the cam 8. The said cam 8 not being permitted to rotate by reason of the lever 11 being set, will move longitudinally on said sleeve 7, and will likewise move the disk 4 longitudinally on its bearing 3 and compress the springs 5. As the disk 2 cannot be moved longitudinally on its shaft 1, the disks 2 and 4 will be pressed nearer together, and the circle of contact of the edges of the belt 15 will be enlarged, and the travel of the belt increased. The said movement of the lever 12 will release the belt tightener 14; to decrease the travel of the belt 15, the lever 12 is moved in the opposite direction. This will decrease the circle of contact of the edges of said belt 15, and decrease the speed thereof, the tightener 14 will take up the slack. The lever 11 will permit the adjustment of the cams by adjusting cam 8.

Having thus described my invention I desire to secure by Letters Patent and claim:

1. In a device of the class described, the combination with a shaft, of one disk of a pulley keyed thereto, the other disk of said pulley slidably keyed to the hub of the first mentioned disk, a cam and anti-friction bearings between said cam and the last mentioned disk, a cam adapted to engage with the first mentioned cam, a lever secured thereon whose lower end is extended, forming bearings for a belt tightener, a belt tightener and a belt whose edges are cut to fit between said disks, as and for the purposes described.

2. In a device of the class described in combination, a shaft, a pulley formed of two disks spaced and resiliently held apart, a cam on said shaft, ball bearings between said cam and said pulley, another cam adapted to engage with the first mentioned cam, each of which cams is provided with an operating lever and a belt tightener secured to one of said levers, as and for the purposes described.

3. In a device of the class described in combination, a shaft, one disk of a pulley keyed thereon, the other disk of said pulley slidably keyed to the hub of said first mentioned disk, a nut threadably secured on the end of said shaft, a sleeve on said nut, cams on said sleeve, a lever on each of said cams, a belt tightener secured to one of said levers and an endless belt whose edges are cut at the same angle as the flanges of said disk, as and for the purposes described.

In testimony whereof I have affixed my signature in presence of two witnesses.

WILLIAM F. MAIN.

Witnesses:
J. J. CORUM,
BEN L. CORUM.